United States Patent [19]

Shimoura et al.

[11] Patent Number: 5,613,055
[45] Date of Patent: Mar. 18, 1997

[54] METHOD OF AND APPARATUS FOR PRODUCING AN ANIMATION HAVING A SERIES OF ROAD DRAWINGS TO BE WATCHED FROM A DRIVER'S SEAT OF A VEHICLE

[75] Inventors: Hiroshi Shimoura; Kenji Tenmoku, both of Osaka, Japan

[73] Assignee: Sumitomo Electric Industries, Ltd., Osaka, Japan

[21] Appl. No.: 86,899

[22] Filed: Jul. 7, 1993

[30] Foreign Application Priority Data

Jul. 14, 1992 [JP] Japan .................................. 4-186834
Apr. 13, 1993 [JP] Japan .................................. 5-086519

[51] Int. Cl.$^6$ .......................... G06T 13/00; G08G 1/133
[52] U.S. Cl. .......................... 395/173; 364/443; 340/995
[58] Field of Search .................................. 395/152, 155, 395/119, 161; 472/60; 273/437; 364/460, 443, 410, 444, 449; 342/451; 340/995; 434/69; 463/6

[56] References Cited

U.S. PATENT DOCUMENTS

| | | | |
|---|---|---|---|
| 4,633,433 | 12/1986 | Miller | 340/995 |
| 4,672,541 | 7/1987 | Bromley et al. | 364/410 |
| 4,937,752 | 6/1990 | Nanba et al. | 364/449 |
| 5,067,082 | 11/1991 | Nimura et al. | 364/449 |
| 5,121,326 | 6/1992 | Moroto et al. | 364/449 |
| 5,184,303 | 2/1993 | Link | 364/449 |
| 5,206,811 | 4/1993 | Itoh et al. | 364/449 |
| 5,220,507 | 7/1993 | Kirson | 364/444 |
| 5,275,565 | 1/1994 | Moncrief | 434/29 |
| 5,315,692 | 5/1994 | Hansen et al. | 395/119 |
| 5,323,321 | 7/1994 | Smith, Jr. | 364/449 |

FOREIGN PATENT DOCUMENTS

| | | | |
|---|---|---|---|
| 0312361 | 4/1989 | European Pat. Off. | G09B 29/10 |
| 0366014 | 5/1990 | European Pat. Off. | G06F 15/72 |
| 0378271 | 7/1990 | European Pat. Off. | G06F 15/72 |
| 0406946 | 1/1991 | European Pat. Off. | G01C 21/20 |
| 2165427 | 4/1986 | United Kingdom | G08G 5/00 |

OTHER PUBLICATIONS

Patent Abstracts of Japan, vol. 14, No. 141 (P–1023) 16 Mar. 1990.

Primary Examiner—Mark K. Zimmerman
Assistant Examiner—Joseph R. Burwell
Attorney, Agent, or Firm—Lane, Aitken & McCann

[57] ABSTRACT

A method of and an apparatus for producing an animation having a series of road drawings to be watched from a driver's seat of a vehicle during a travel between two predetermined positions in a road map. The road drawings are formed on the basis of road data indicative of roads and obtained through three-dimensional computer graphics. Road map data indicative of the road map are stored in a road map data base device and includes node data indicative of nodes formed by intersections, corners and ends of the roads, link data indicative of links each connecting two of the nodes to define a road segment and road width data indicative of the widths of the road segments. The road map data covering a travel route between the predetermined positions are selected by a calculator from the road map data base device. The road data are calculated by the calculator on the basis of the selected road map data to produce the animation in such a manner that the roads are three-dimensionally shown in the road drawings.

12 Claims, 13 Drawing Sheets

METHOD OF AND APPARATUS FOR PRODUCING AN ANIMATION HAVING A SERIES OF ROAD DRAWINGS TO BE WATCHED FROM A DRIVER'S SEAT OF A VEHICLE

FIELD OF THE INVENTION

The present invention relates to a method of and an apparatus for producing an animation having a series of road drawings to be watched from a driver's seat. The road drawings are obtained on the basis of road map data through three-dimensional computer graphics.

DESCRIPTION OF THE PRIOR ART

There have been so far proposed a method of and an apparatus for producing an animation having a series of road drawings to be watched from a driver's seat of a vehicle. If such an animation is displayed on the screen of a display unit placed in a playing room, the animation is useful for a driving simulation in the room. For example, the animation can be produced by executing a computer graphics software.

When, however, the animation is produced by executing programs of such a computer graphics software, it is necessary that an animator should imaginatively derive road data (including data indicative of a pattern of a travel route, data indicative of the shapes of the roads forming the travel route, and data indicative of the widths of the roads) indicative of the road drawings forming the animation, thereby having the animator extremely expend his labor and time. In addition, the variety of the travel route pattern is so restricted that the animation loses its popularity soon.

The present invention has been made to overcome the foregoing problems in the prior art, and a first object of the present invention is to provide a method of producing an animation having a series of road drawings showing roads which are in existence.

It is a second object of the present invention to provide an apparatus capable of displaying the animation in such a manner that the animation is synchronous with the actual vehicle travel.

SUMMARY OF THE INVENTION

The foregoing first object of the present invention can be achieved by providing a method of producing an animation having a series of road drawings to be watched from a driver's seat of a vehicle during a travel between two predetermined positions in a road map, the road drawings being formed on the basis of road data obtained through three-dimensional computer graphics, and the road data being indicative of roads shown in the animation, comprising the steps of: preparing travel route data providing means for providing travel route data indicative of a travel route between the predetermined positions, and road map data storing means for storing road map data including node data indicative of nodes formed by intersections, corners and ends of roads, link data indicative of links each connecting two of the nodes to define a road segment, and road width data indicative of the widths of the road segments, selecting from the road map data storing means the road map data covering the travel route based on the provided travel route data, and calculating the road data on the basis of the selected road map data to produce the animation in such a manner that the roads are three-dimensionally shown in the road drawings.

In addition, the foregoing first object of the present invention can be achieved by providing a method of producing an animation having a series of road drawings to be watched from a driver's seat of a vehicle during a travel between two predetermined positions in a road map, the road drawings being formed on the basis of road data and background data obtained through three-dimensional computer graphics, and the road data and the background data being indicative of roads and backgrounds, respectively, shown in the animation, comprising the steps of: preparing travel route data providing means for providing travel route data indicative of a travel route between the predetermined positions, road map data storing means for storing road map data including node data indicative of nodes formed by intersections, corners and ends of roads, link data indicative of links each connecting two of the nodes to define a road segment and road width data indicative of the widths of the road segments, and random number generating means for generating random numbers, selecting from the road map data storing means the road map data covering the travel route based on the travel route data, calculating the road data on the basis of the selected road map data to produce the animation in such a manner that the roads are three-dimensionally shown in the road drawings, and calculating the background data on the basis of the generated random numbers to produce the animation in such a manner that the backgrounds are three-dimensionally shown in the road drawings.

The foregoing second object of the present invention can be achieved by providing an apparatus for producing an animation having a series of road drawings to be watched from a driver's seat of a vehicle during a travel from the current position of the vehicle to a destination, the road drawings being formed on the basis of road data and background data obtained through three-dimensional computer graphics, and the road data and the background data being indicative of roads and backgrounds, respectively, shown in the animation, comprising: vehicle position detecting means for detecting the current position of the vehicle, optimum travel route data calculating means for calculating optimum travel route data indicative of an optimum travel route between the current position of the vehicle and the destination, road map data storing means for storing road map data to be referred to during the travel on the optimum travel route, road map data selecting means for selecting from the road map data storing means the road map data covering the optimum travel route, road data calculating means fop calculating the road data on the basis of the selected road map data to produce the animation in such a manner that the roads are three-dimensionally shown in the road drawings, background data calculating means fop calculating the background data to produce the animation in such a manner that the backgrounds are three-dimensionally shown in the road drawings, and animation displaying means for displaying the produced animation.

BRIEF DESCRIPTION OF THE DRAWINGS

The features and advantages of a method of and an apparatus for producing an animation having a series of road drawings to be watched from a driver's seat of a vehicle in accordance with the present invention will be more clearly understood from the following description take in conjunction with the accompanying drawings in which:

FIGS. 6(a) and 6(b) are explanatory illustrations showing processes of smoothing an intersection profile and sidewalk profiles by curved lines and the like.

DESCRIPTION OF THE PREFERRED EMBODIMENTS

An embodiment of an animation producing system adopting an animation producing method according to the present invention will be hereinlater described with reference to FIGS. 1 to 12 of the drawings.

The animation produced by the animation producing system has a series of road drawings to be watched from a driver's seat of a vehicle during a travel between two predetermined positions in a road map. The road drawings are formed on the basis of road data and background data obtained through three-dimensional computer graphics. The road data and the background data are indicative of roads and backgrounds, respectively, shown in the animation, and integrally forms road drawing data indicative of the road drawings.

Figure 1:
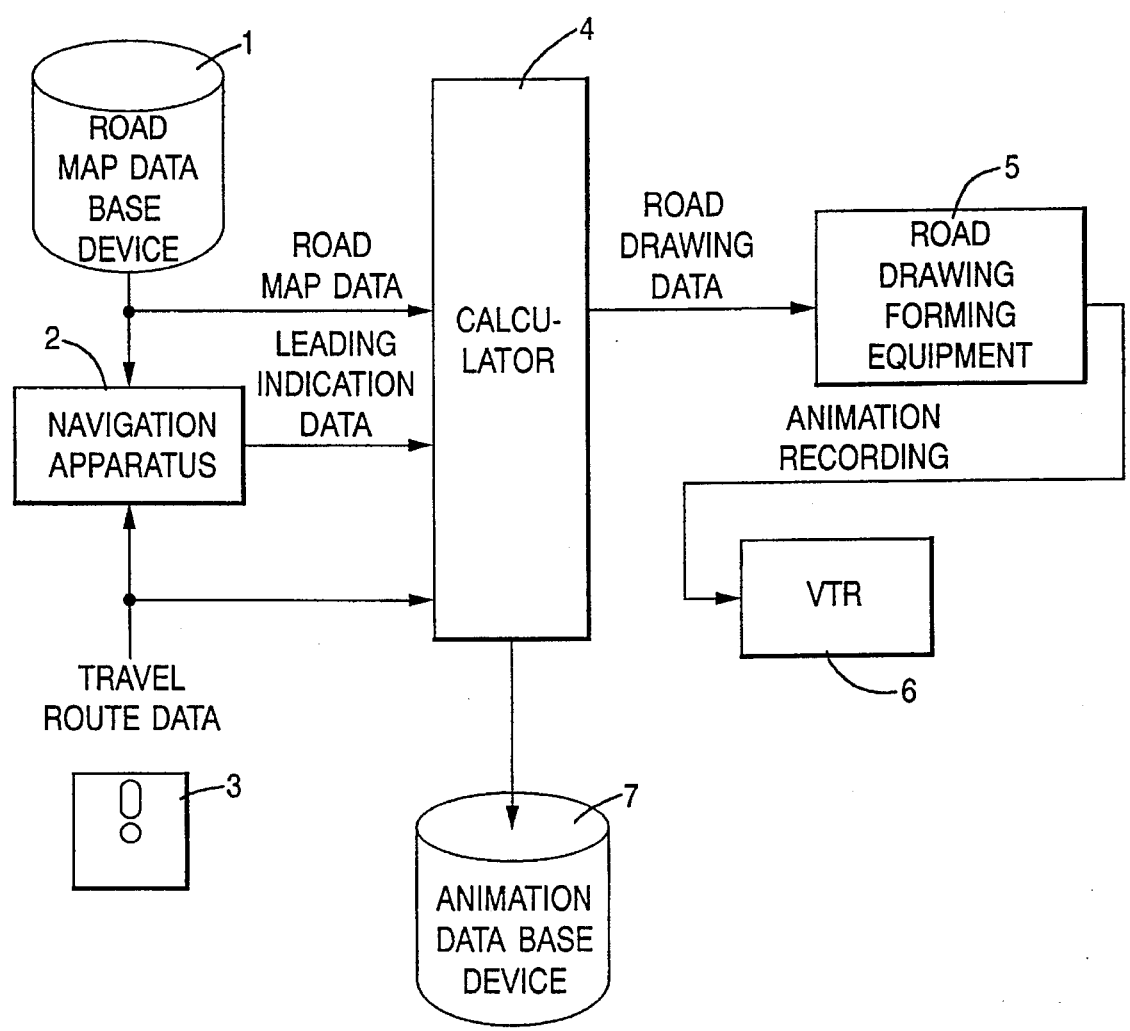
FIG. 1 is a schematic block diagram of an animation producing system employing an animation producing method according to the present invention.

FIG. 1 is a block diagram showing the animation producing system which comprises a road map data base device 1, a navigation apparatus 2, a flexible disk 3, a calculator 4, road drawing forming equipment 5, a video tape recorder (hereinlater simply referred to as "VTR") 6, and an animation data base device 7.

The flexible disk 3 stores and provides travel route data indicative of a travel route between the aforementioned predetermined positions, i.e., to be traveled by the vehicle. Additionally, the travel route data includes travel speed data indicative of the travel speed of the vehicle in the animation. The advance speed of the animation is determined in such a manner as to be varied in response to the travel speed of the vehicle.

The road map data base device 1 such as for example a CD-ROM (Compact Disc of Read Only Memory) stores road map data formed by the whole country map data base providing maps drawn to a scale of for example 1/2,500. The road map data are indicative of road maps formed by a plurality of nodes and a plurality of links. In other words, the road map data include node data indicative of nodes formed by intersections, corners and ends of roads, link data indicative of links each connecting two of the nodes to define a road segment and road width data indicative of the widths of the road segments. The positions of the nodes are represented by coordinates. Each of the links is to be represented as a vector defined by coordinates of two nodes connected by the link.

The navigation apparatus 2 is adapted to generate leading indication data indicative of the travel route, the current position of the vehicle and the advance direction in which the vehicle is to advance at each of the intersections on the travel route. Based on the leading indication data, the travel route, the current position and the advance direction of the vehicle are displayed as the navigational guidance described hereinafter on a screen of a display unit not shown. In addition, the leading indication data are used for phonetically indicating the advance direction when the vehicle approaches toward each of the intersections.

A conventional navigation apparatus comprises a position detecting equipment for detecting the current position of the vehicle, and a travel route calculating equipment for calculating travel route data indicative of the optimum travel route. The vehicle position detecting equipment comprises a direction sensor for detecting the travel direction of the vehicle and a speed sensor for detecting the travel speed of the vehicle. The current position of the vehicle is derived on the basis of the outputs of the direction sensor and the speed sensor. Additionally, the conventional navigation apparatus reads out the road map data covering the current position of the vehicle from a map data base device so as to have a display unit displaying the current position of the vehicle and the road map covering the current position of the vehicle in such a manner that the current position of the vehicle is overlaid upon the road map. In the conventional navigation apparatus, therefore, the foregoing leading indication data are calculated on the basis of the detected current position of the vehicle and the calculated optimum travel route. Such a conventional navigation apparatus is generally known and disclosed in, for example, Japanese patent laid-open publication No. 2-6713.

In the present embodiment, however, the navigation apparatus 2 is designed to input from, for example, the calculator 4 the position data indicative of the provisional current position of the vehicle and the travel route data provided from the flexible disk 3 on the assumption that the vehicle is traveling the travel route based on the provided travel route data. The navigation apparatus 2 calculates the leading indication data on the basis of the position data indicative of the provisional current position the vehicle and the travel route data provided from the flexible disk 3.

The calculator 4 is electrically connected to the road map data base device 1, the navigation apparatus 2, the flexible disk 3, the road drawing forming equipment 5 and the animation data base device 7, and functions as a random number generator. In the calculator 4, the road data and the background data are calculated by, for example, executing programs of a three-dimensional computer graphics software placed on the market.

The processes of producing the animation will be described hereinafter. First, the road map data covering the travel route derived from the flexible disk 3 are selected and read out by the calculator 4 from the road map data base device 1. Based on the selected road map data, the road data are calculated by the calculator 4 in such a manner that the roads are three-dimensionally shown in the road drawings. Then, the background data are calculated by the calculator 4 on the basis of the random numbers in such a manner that the backgrounds are three-dimensionally shown in the road drawings.

The road drawing data formed by the road data and the background data calculated by the calculator 4 are fed to the road drawing forming equipment 5 or the animation data base device 7.

When the road drawing data including the road data and the background data calculated by the calculator 4 are processed by the road drawing forming equipment 5, the series of road drawings are generated, thereby making it possible to produce the animation in the NTSC (National Television System Committee) formula. The produced animation is recorded in the VTR 6.

The processes of calculating the aforementioned road data will be more specifically described hereinafter.

The road data are calculated on the basis of the foregoing selected road map data in such a manner that the road data are indicative of realistic road images each having appropriate width. If necessary, the road data are further calculated in such a manner that sidewalks are added to the realistic road image.

Figure 2A:
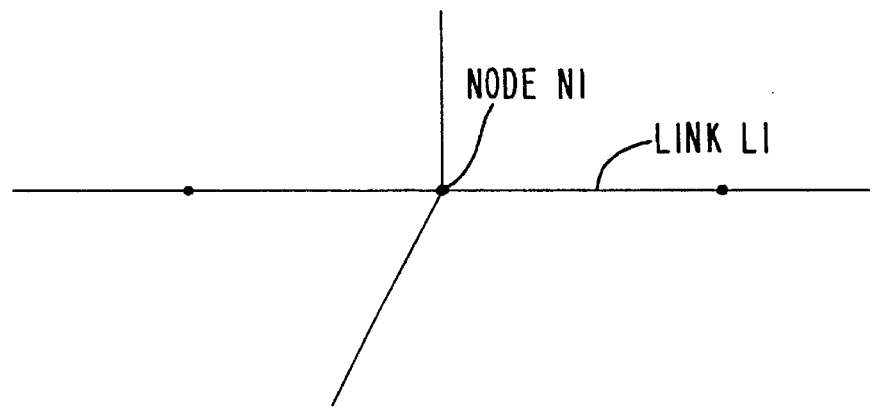
FIGS. 2(a) to 2(c) are explanatory illustrations showing processes of forming a realistic road image from nodes and links.
Figure 2B:
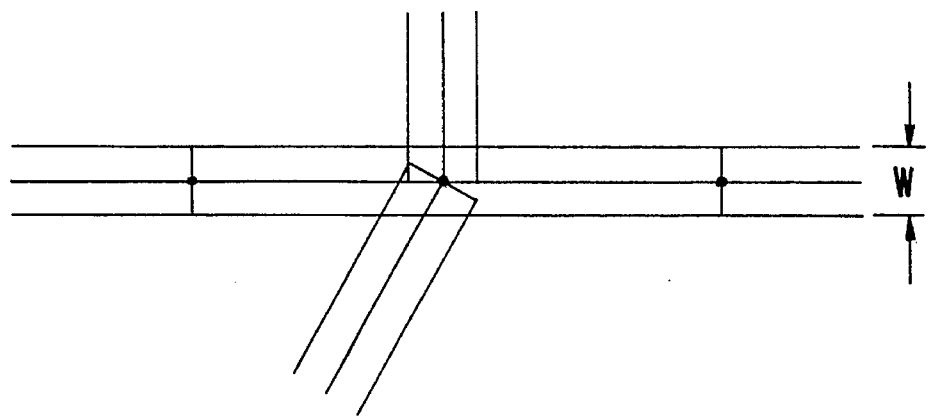
Figure 2C:
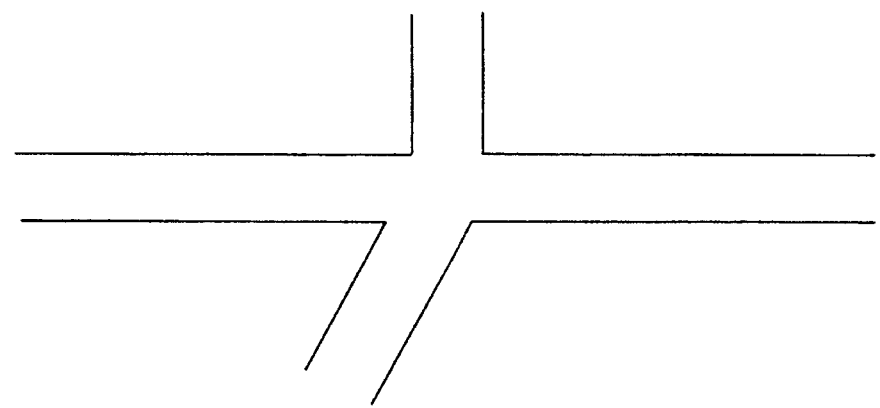
Figure 3A:
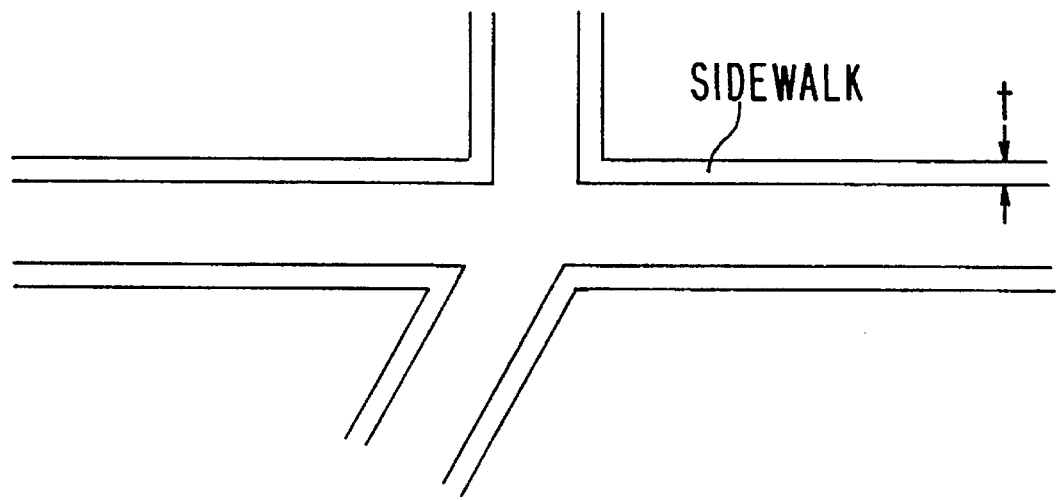
FIGS. 3(a) and 3(b) are explanatory illustrations showing processes of forming a realistic road image after the processes shown in FIG. 2(c)
Figure 3B:
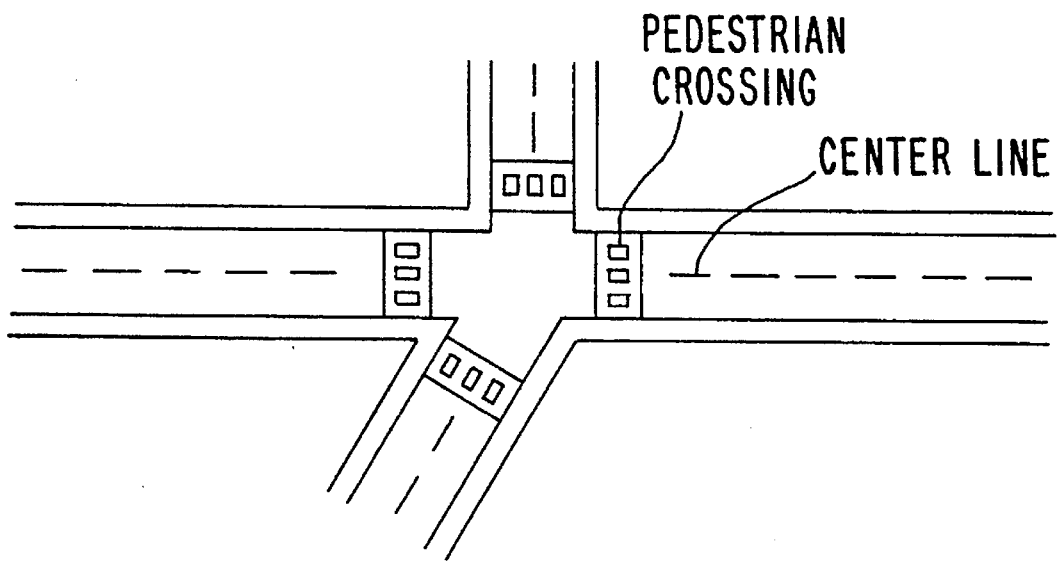

FIGS. 2 and 3 are plan views representing the roads for explaining the processes of forming the realistic road image. FIG. 2(a) shows the node N1 indicative of an intersection, and four links (including the link L1) extending from the node N1 and indicative of four road segments. The widths W of the road segments are determined on the basis of the aforementioned road width data, thereby making it possible to derive the profiles of the roads segments as shown in FIG. 2(b). The unnecessary lines and dots shown in FIG. 2(b) are eliminated in order to derive the realistic road image shown in FIG. 2(c). Additionally, sidewalks having widths t are added to the realistic road image as shown in FIG. 3(a), and then pedestrian crossings and center lines are also added to the realistic road image as shown in FIG. 3(b).

Figure 4A:
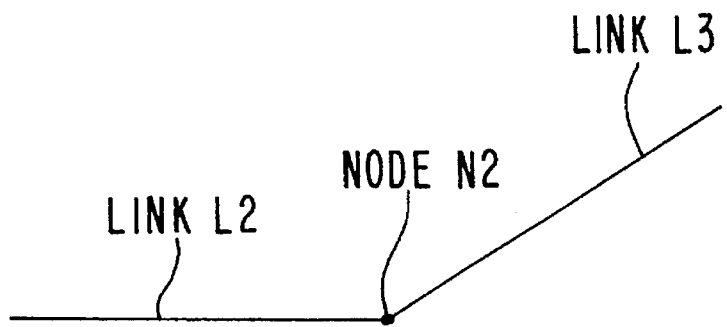
FIGS. 4(a) to 4(c) are explanatory illustrations showing road profile smoothing processes in the case that two Links extend from one node in different directions.
Figure 4B:
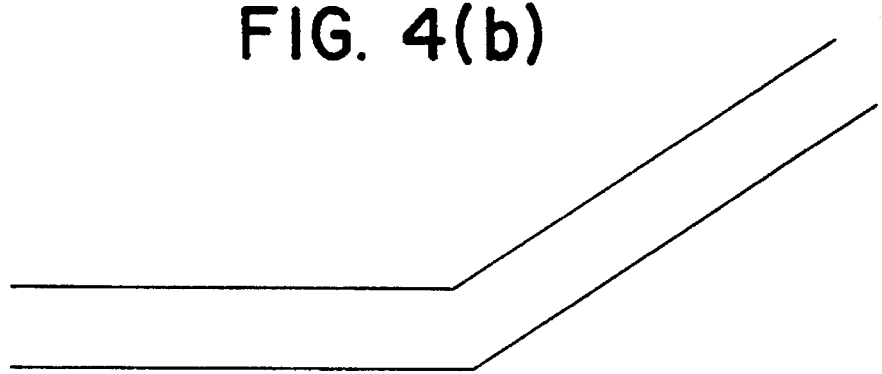
Figure 4C:
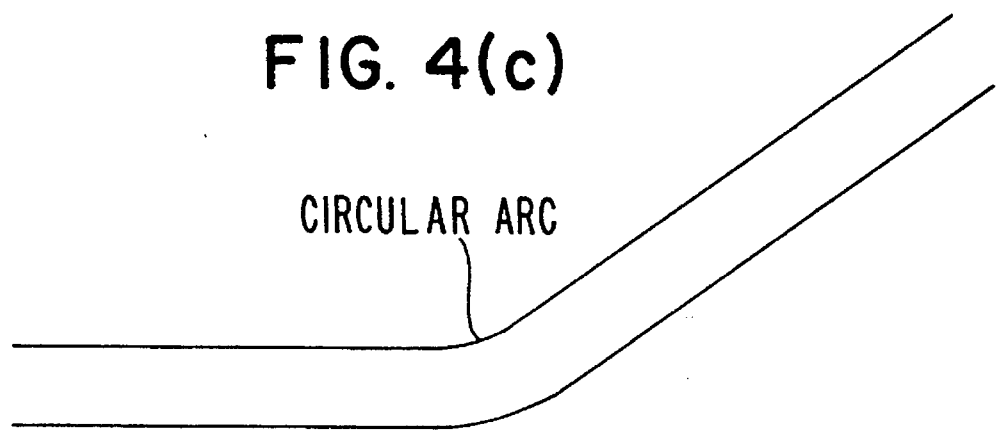

If two links extend from one node in different directions, i.e., the links L2 and L3 extend from the node N2 as shown in FIG. 4(a), the realistic road image derived on the basis of the links L2 and L3 and the node N2 is shown in FIG. 4(b). The road profile shown in FIG. 4(b) however is unnatural in comparison with the profile of the actual road, since the road profile shown in FIG. 4(b) is formed by merely straight lines. In this case, a smoothing process is carried out in order to smooth the corners of the roads. As a result, the profile of the corner of the road is defined by curved lines such as circular arcs as shown in FIG. 4(c).

Figure 5A:
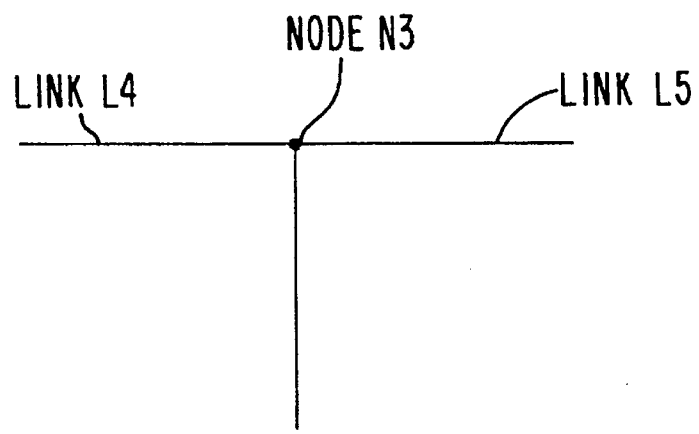
FIGS. 5(a) to 5(c) are explanatory illustrations showing intersection profile smoothing processes in the case that links representing different roads in width extend from one node.
Figure 5B:
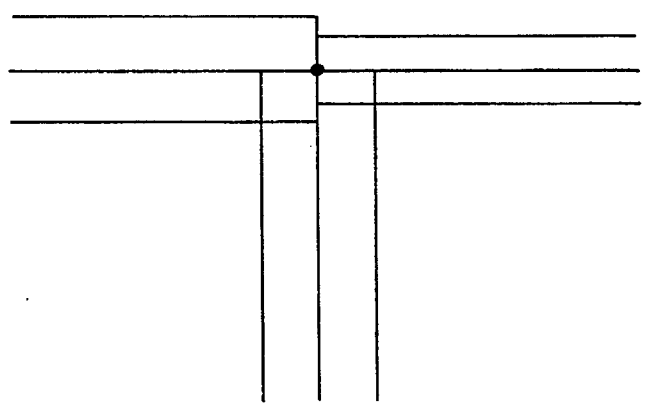
Figure 5C:
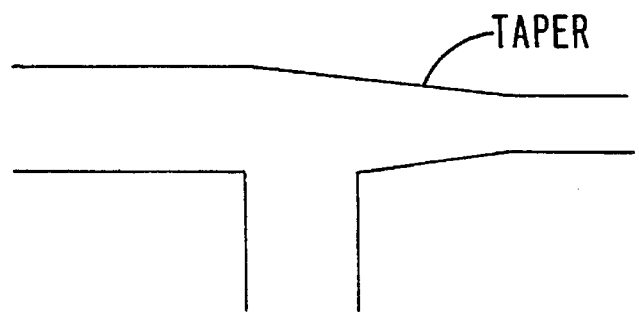

If a plurality of links representing roads different in width extend from one node, i.e., the links L4 and L5 extend from the node N3 as shown in FIGS. 5(a) and 5(b), the realistic road image is formed in such a manner that the roads formed on the basis of the links L4 and L5 are connected to each other by means of a road segment having a taper profile portion as shown in FIGS. 5(c).

Figure 6A:
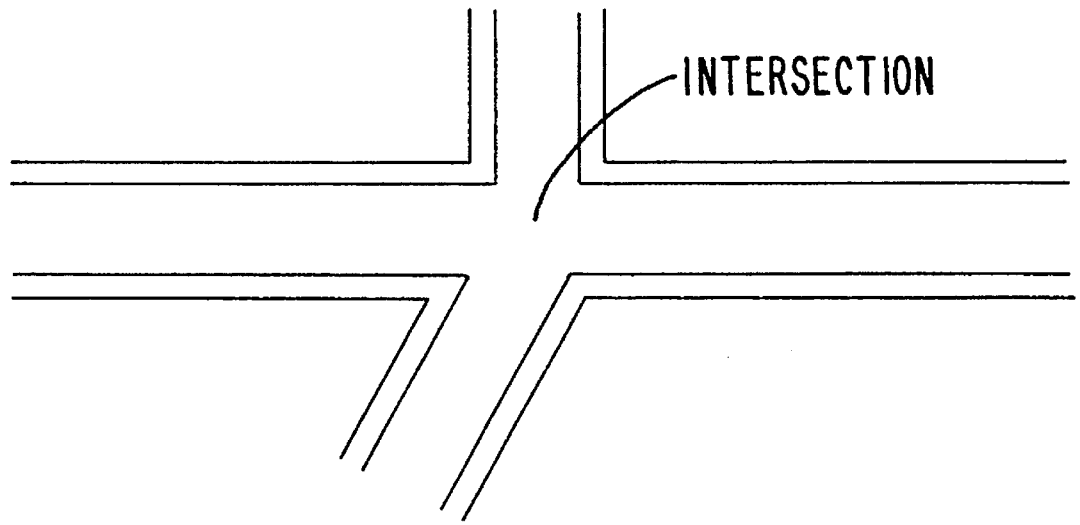
Figure 6B:
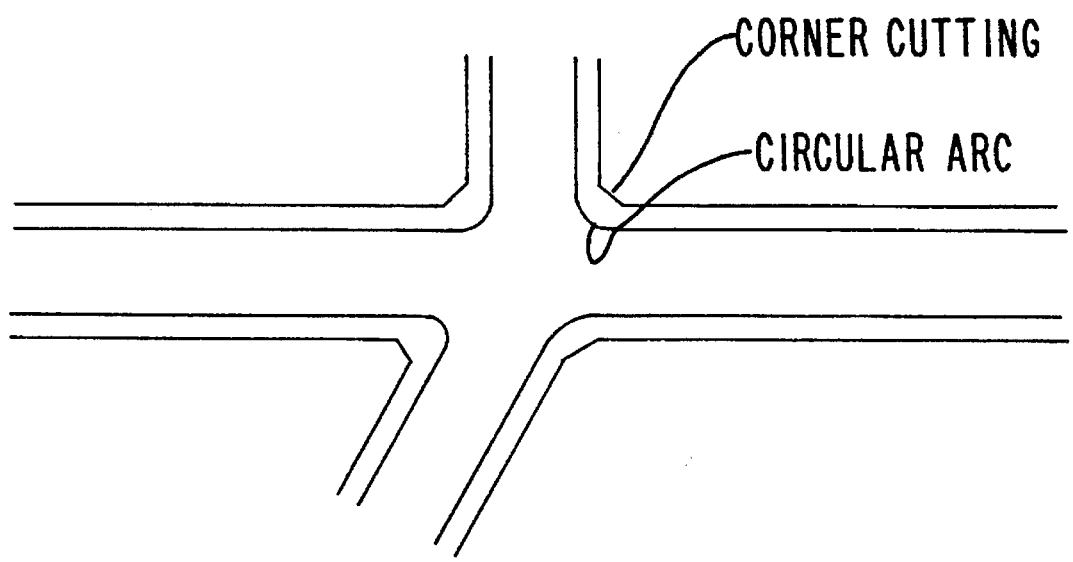

In the processes of forming the realistic road image representing an intersection, the aforementioned smoothing process are carried out in order to smoothly connect the lines forming the road profiles, since the realistic road image shown in FIG. 6(a) is unnatural in comparison with the actual intersection. In addition, another smoothing process is carried out in order to cut the corner of each of the blocks enclosed by sidewalks, respectively. After the foregoing smoothing processes, the realistic road image shown in FIG. 6(b) are derived.

When the sidewalks are added to the realistic road image, the road data are calculated in such a manner that each of the sidewalks has a width of 1.5 meters and is flush with the road or in such a manner that each of the sidewalks has a width of 3 meters and has sidewalk surface higher than the road surface by 20 centimeters.

The processes of calculating the background data on the basis of the random numbers will be more specifically described hereinlater.

The background data includes architecture data indicative of architectures such as buildings and dwelling houses, traffic light data indicative of traffic lights, road sign data indicative of road signs, guardrail data indicative of guardrails and, tree and shrub data indicative of trees and shrubs.

If the background comprises the images of the buildings, the width, the depth and the height of each of the buildings can be varied within predetermined ranges, respectively, each having a predetermined standard value and defined by a predetermined maximum value and a predetermined minimum value. The width, the depth and the height of each of the buildings are determined on the basis of the random numbers in such a manner as to be within the predetermined ranges, respectively. On the other hand, the positions of the buildings are determined in such a manner that each of the buildings is positioned along the road. In addition, the number of the buildings positioned along one road are determined in response to the length of the link forming the road. The architecture data include dwelling house data indicative of several kinds of the dwelling house. The dwelling houses are similarly positioned along the road, and the number of each of the dwelling houses are similarly determined in response to the length of the link forming the road.

Figure 7A:
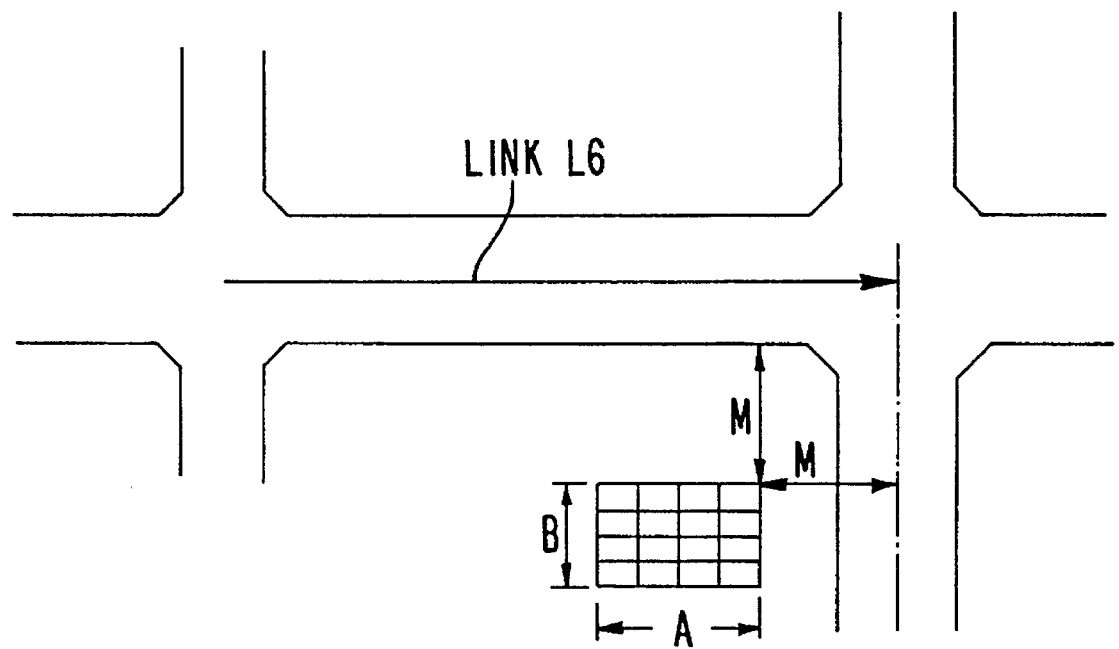
FIGS. 7(a) and 7(b) are explanatory illustrations showing processes of positioning an architecture on the basis of the random numbers.

If, for example, the length of the link is less than 120 meters, there is no architecture positioned along the road defined the link. If the length of the link exceeds 120 meters, at least one architecture is positioned along the roads. In FIG. 7(a), the width A of the building is determined on the basis of the random numbers in such a manner as to be represented by an integer in meters and to be within a range from 20 meters to the length of the link L6. The depth B of the building is determined on the basis of the random numbers in such a manner as to be represented by an integer in meters and to be within a range from 20 to 50 meters. The height of the building is determined on the basis of the random numbers in such a manner as to be represented by an integer in meters and to be within a range from 30 to 80 meters. The color used for painting the building is selected from predetermined eight colors on the basis of the random numbers. The design of building is selected from predetermined two designs on the basis of the random numbers.

If the architecture is positioned along the road defined by the link L6 shown in FIG. 7(a) in the neighborhood of the intersection at which the road intersects with another road at a right angle, the distance M between the architecture and the road defined by the link L6, and the distance M between the architecture and the alternate long and short dash line passing the end of the link L6 are determined, for example, to be 10 meters. Preferably, the distances M may exceed half of the width of the road defined by the link L6.

Figure 7B:
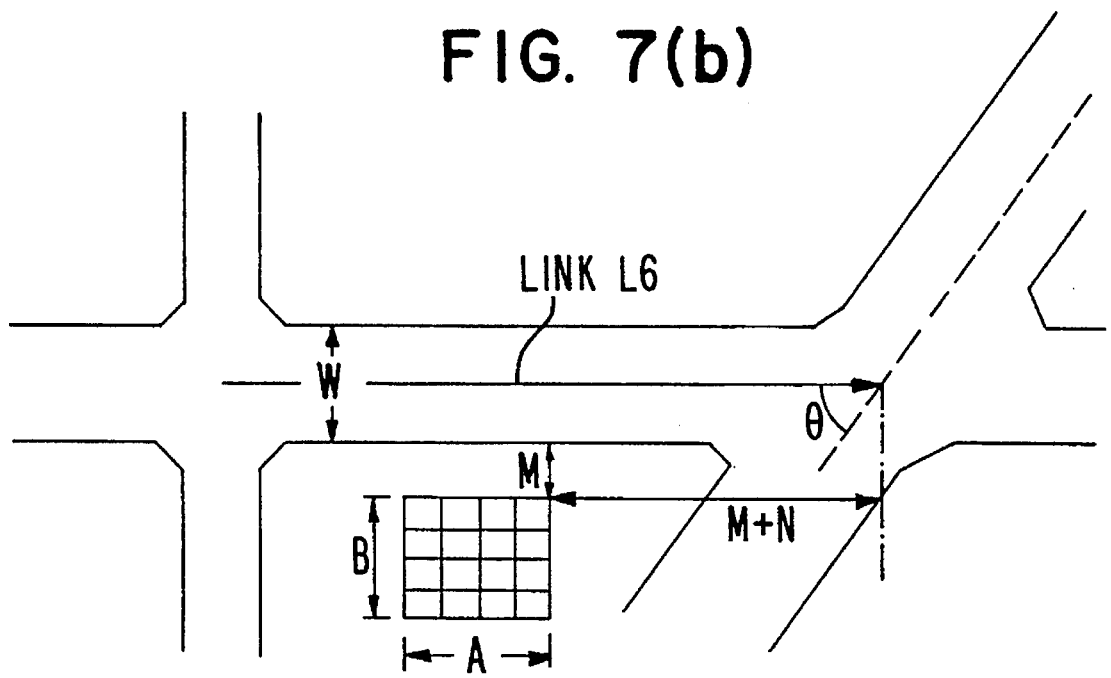

If, however, the architecture is positioned along the road defined by the link L6 shown in FIG. 7(b) in the neighborhood of the intersection at which the road intersects with another road at the acute angle θ, the aforementioned determination of the distances M sometimes results in the fact that the image of the building is overlapped with the image of the another road. For this reason, it is necessary that the distance between the architecture and the alternate long and short dash line passing the end of the link L6 should be represented by (M+N) instead of M. The distance N, for example, is determined by a formula represented as follows.

$$N=\{M+B+(W/2)\}/\tan\theta$$

Figure 8A:
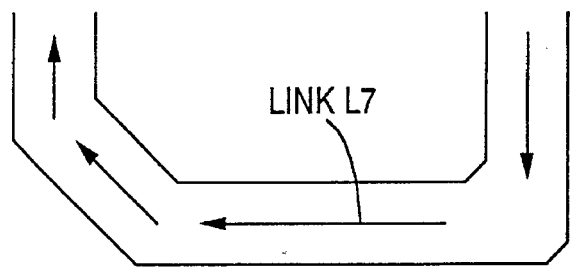
FIGS. 8(a) to 8(e) are explanatory illustrations showing processes of eliminating an architecture overlapped with the previous architecture.
Figure 8B:
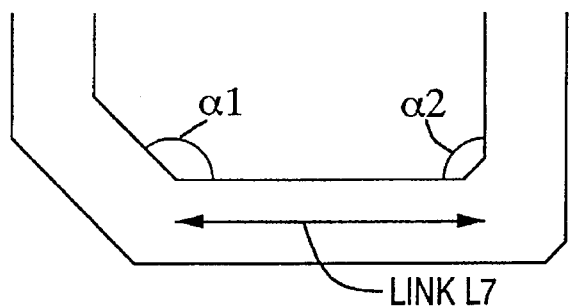
Figure 8C:
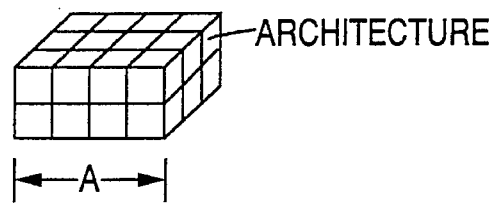
Figure 8D:
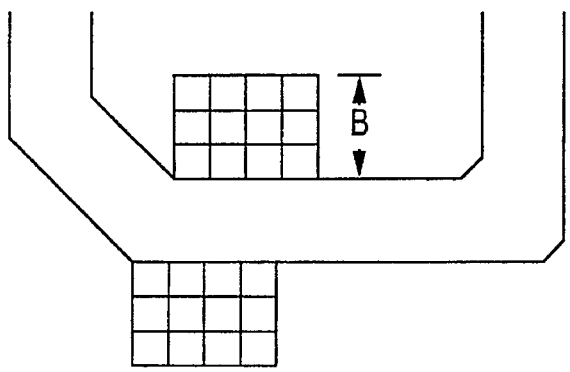
Figure 8E:
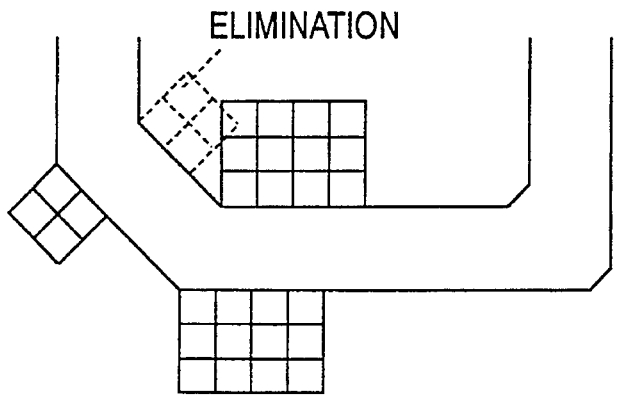

When, additionally, a plurality of architectures are positioned in the road image having a plurality of corners within a narrow area, it is necessary that attention should be paid to the overlap of the architectures. If, for example, the architectures are positioned along the cranked road defined by a plurality of links including the link L7 as shown in FIG. 8(a), the angles α1 and α2 shown in FIG. 8(b) between the link L7 and the adjoining links are calculated, and then the size of the architecture shown in FIG. 8(c) is determined on the basis of the random numbers in view of the calculated angles α1 and α2. As shown in FIG. 8(d), two architectures are positioned in the neighborhood of the end of the link L7 so as to be opposite to each other through the road defined the link L7 under the condition that the aforementioned distances M are equal to 0. The next architectures are similarly positioned in the neighborhood of the end of the next link as shown in FIG. 8(e). If, however, one of the next architectures and one of the previous architectures are overlapped with each other in part, the next architecture is eliminated from the road image as shown in FIG. 8(e).

The traffic lights for the vehicles are positioned at the specified intersections and each periodically indicates red, amber and green. The traffic lights for the pedestrians are positioned at the pedestrian crossing in the neighborhood of the specified intersections and each periodically indicates red and green.

The road signs are positioned at the specified intersections. The trees and shrubs, and the guardrails are positioned along the specified roads. The sky of the background are painted in sky blue. The color of the open space between the architectures in the background is predetermined.

Figure 9:
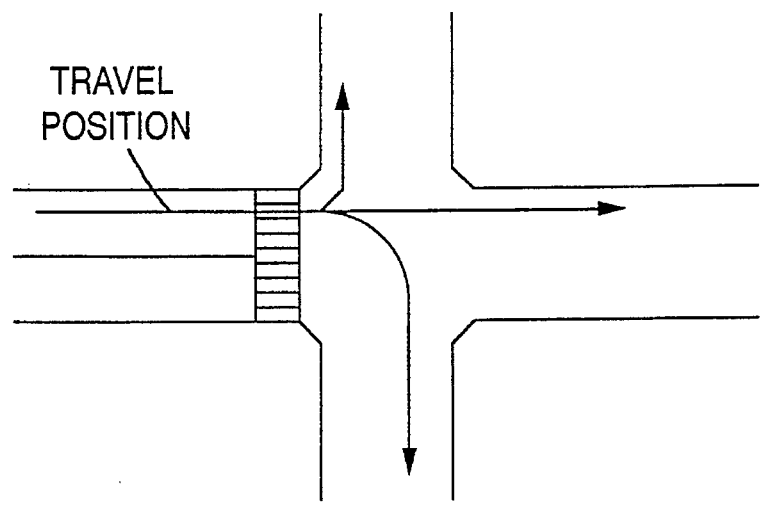
FIG. 9 is an explanatory illustration showing the travel position while the vehicle passing through an intersection.
Figure 10:
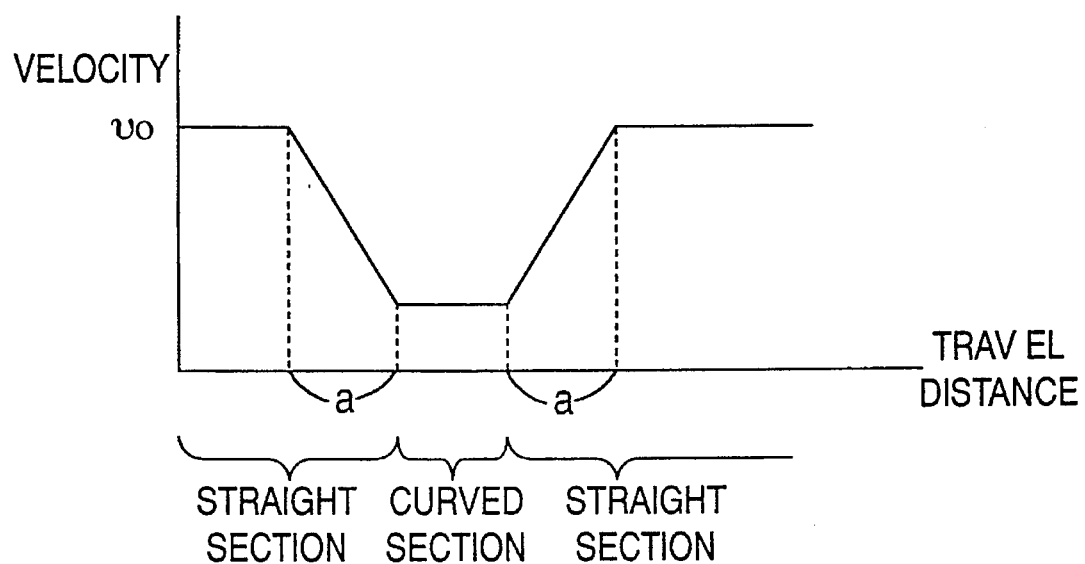
FIG. 10 is a diagram showing the vehicle speed in the animation while the vehicle passes through intersections and corners.

The height of the view point in the animation is similar to that (for example 1.2 meters) of the eyes of the driver on the driver's seat. If the width of the vehicle is 1.6 meters, the view point in the animation is positioned at the right side of the center of the vehicle in such a manner as to be remote from the center by 0.4 meters. The angles in the view point of the animation between two planes defining the horizontal visual field and between two planes defining the vertical visual field are 140 degrees and 100 degrees, respectively. The vehicle in the animation travels on the center of the left lane of the center line as shown in FIG. 9. As will be understood from the diagram shown in FIG. 10, the vehicle in the animation slows down during a travel of a predetermined distance a before a rapid variation of the advance direction of the vehicle. On the other hand, the vehicle in the animation speeds up during a travel of the predetermined distance a after the rapid variation of the advance direction of the vehicle.

According to the aforementioned processes, the road data and background data are calculated thorough the three-dimensional computer graphics, thereby making it possible to produce the animation having the series of the road drawings to be watched from the driver's seat.

Figure 11:
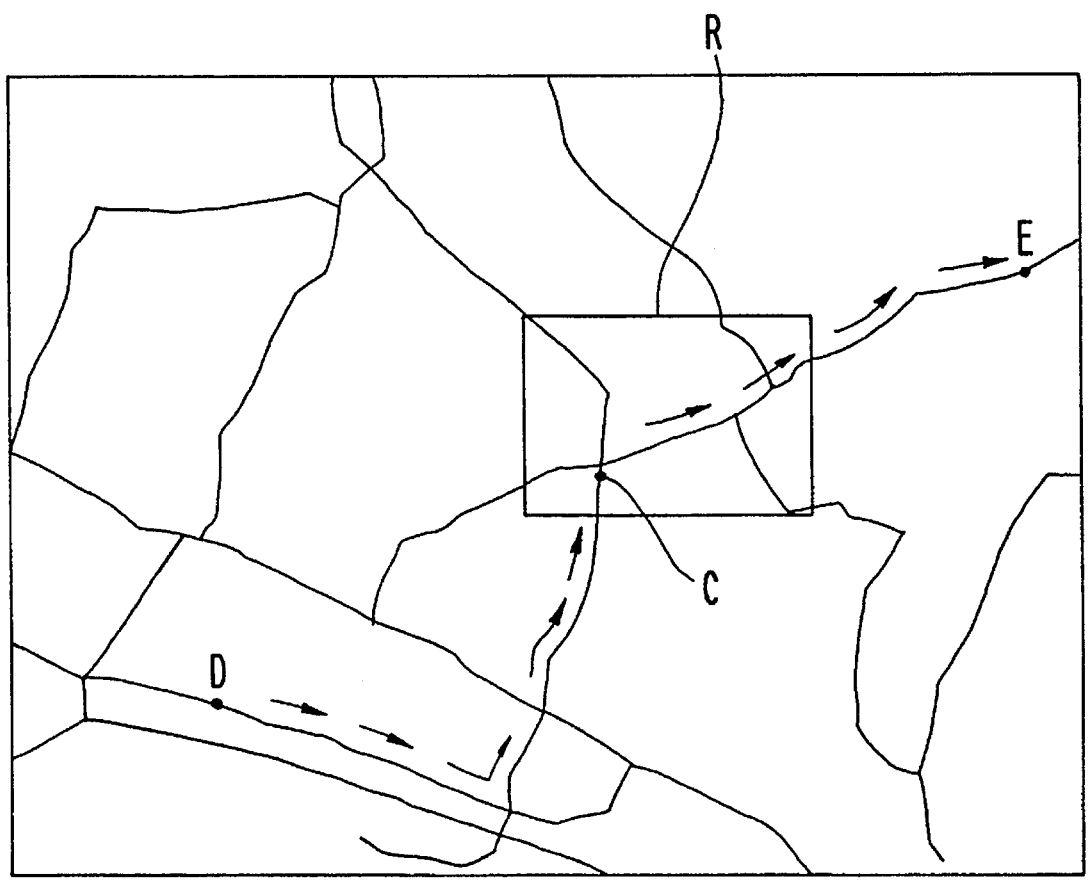
FIG. 11 is a diagram showing a road map defined by the links and nodes.
Figure 12:
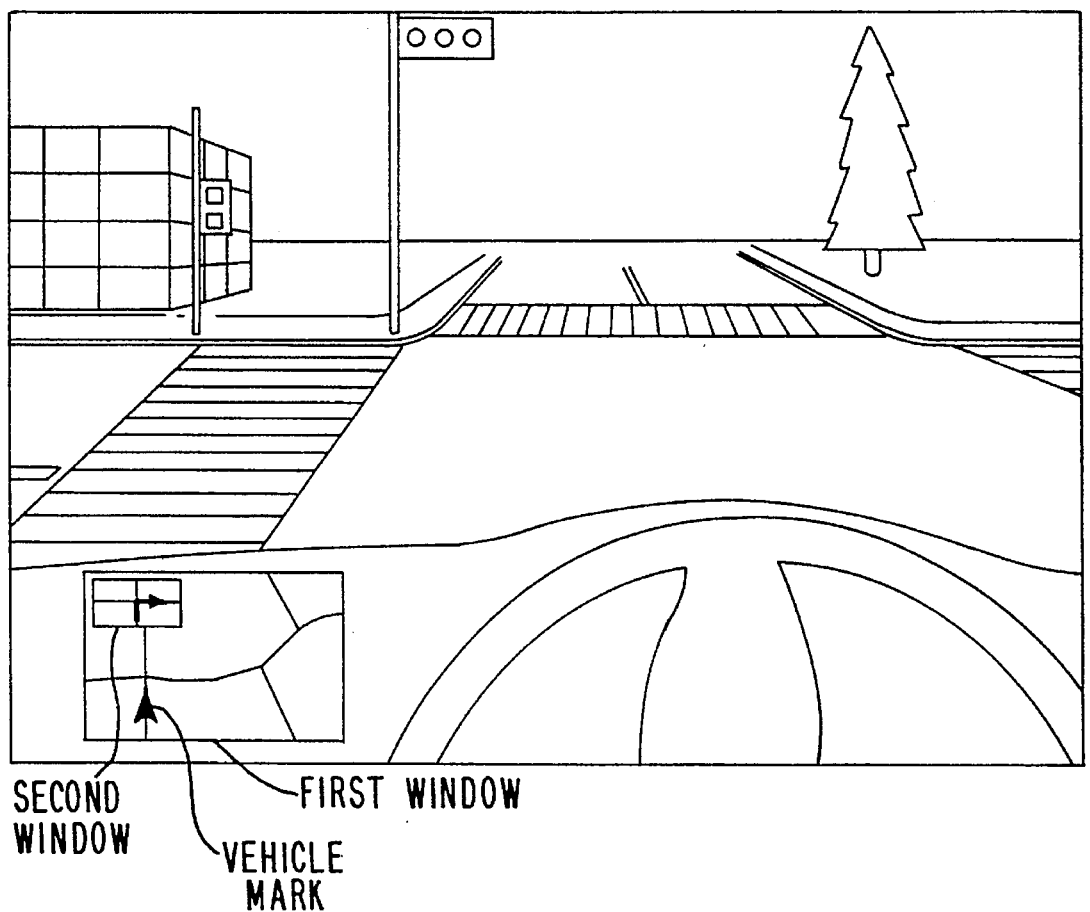
FIG. 12 is a diagram showing a road drawings partially forming the animation.

Next, an example of the animation will be explained. If a certain area, for example, Edogawa-ku in Japan is selected, a road map shown in FIG. 11 and formed by the nodes and the links is derived from the road map data base device 1. If the vehicle is to travel from a position D to a position E, the travel route data indicative of the travel route (referred to arrows in FIG. 11) between the positions D and E are fed to the calculator 4 in order to calculate the road data and the background data on the basis of the travel route data by the foregoing processes, thereby making it possible to produce the animation having the series of road drawings to be watched from the driver's seat. One of the road drawings is shown in FIG. 12 and represents a street scene seen through the front window by the eyes of the driver on the driver's seat before the vehicle reaches the intersection defined by the position C in FIG. 11. The road drawing shown in FIG. 12 includes center lines, sidewalks and pedestrian crossings. The corners of the intersection are defined by curved lines in the road drawing. Additionally, the road drawing includes the traffic lights, the building and the tree positioned in the neighborhood of the intersection.

The display unit opens first and second windows on its own screen showing the road drawing and displays the navigational guidance derived from the navigation apparatus 2 so as to show the travel road and the advance direction of the vehicle to the driver. More specifically, the first window shows a road map area similar to the rectangular area R covering the position C as shown in FIG. 11 and indicates by a predetermined mark the current position of the vehicle on the road map. As shown in FIG. 12, the second window opened in the first window indicates the advance direction in which the vehicle is to advance at the intersection. The color of each of the roads forming the travel route may be determined in such a manner as to be different from that of the other roads in the road map. The buildings, the traffic lights and the like are not shown in the navigational guidance. The navigational guidance is shown in the first and second windows in such a manner that the vehicle advances in the perpendicular direction in FIG. 12. However, the north in the road map may correspond to the upper part of the windows.

After the advance direction is indicated in the second window, the vehicle is to turn according to the indicated advance direction, for example, to the right as shown in FIG. 12. After, therefore, the vehicle turns according to the indication, the second window is unnecessary and thus closed. On the other hand, the mark indicative of the current position of the vehicle shown in the first window is moved to the next link synchronously with the movement of the vehicle. At the same time, the vehicle in the animation shown on the screen of the display unit turns to the right at the intersection.

In this embodiment, the navigational guidance shown in the first window in FIG. 12 shows the rectangular area R shown in FIG. 11. However, the navigational guidance may indicate a large area, for example, the whole area in FIG. 11 instead of or in addition to the rectangular area R.

As will be understood from the aforementioned description, the road data and the background data are automatically calculated by the calculator 4, thereby making it possible to produce and display the animation. Particularly, the background data indicative of the backgrounds in the animation are calculated on the basis of random numbers, thereby making it possible to cause the backgrounds in the animation to be full of variety.

In addition, the navigational guidance derived by the navigation apparatus 2 is displayed synchronously with the animation. If, therefore, the animation producing system comprising the navigation apparatus is not mounted on the vehicle, the accuracy of the navigational guidance generated by the navigation apparatus 2 can be appreciated by the animation.

An embodiment of an animation producing apparatus according to the present invention will be described hereinlater. In the aforementioned embodiment shown in FIG. 1, the animation producing system comprises the navigation apparatus. On the other hand, the navigation apparatus of the present embodiment forms the animation producing apparatus comprising a display unit designed to display the animation at real time during the actual travel of the vehicle, or display the animation during the confirmation of the travel route before the actual travel.

The navigation apparatus forming the animation producing apparatus is mounted on a vehicle and designed to produce an animation having a series of road drawings to be watched from the driver's seat of the vehicle. The road drawings are formed on the basis of road data and background data obtained through three-dimensional computer graphics and are varied during a travel on an optimum travel route from the current position of the vehicle from a destination. The road data and the background data are indicative of roads and backgrounds, respectively, shown in the animation.

Figure 13:
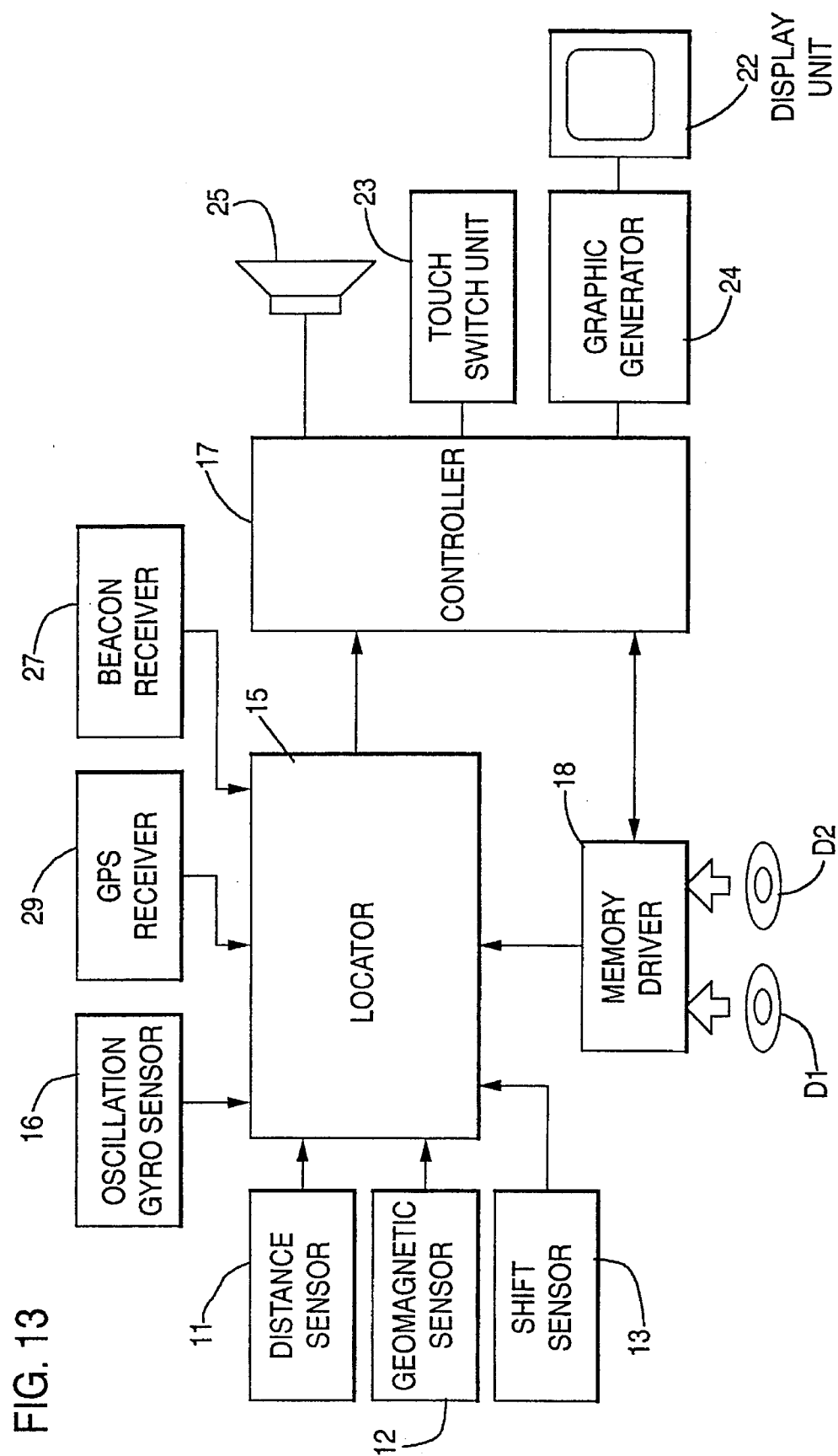
FIG. 13 is a block diagram showing a navigation apparatus comprising an animation producing apparatus according to the present invention.

FIG. 13 is a block diagram representing the navigation apparatus which comprises a distance sensor 11 for detecting the travel distance of the vehicle, a geomagnetic sensor 12 for detecting the travel direction of the vehicle, a shift sensor 13 for detecting the forward and backward movement of the vehicle, a locator 15 deriving signals from the sensors 11, 12 and 13, an oscillation gyro sensor 16 for detecting the turn angle of the vehicle and feeding its own output signal to the locator 15, controller 17 forming the center of the control of the navigation apparatus, a memory driver 18 for reading out data from a map indication data disk D1 and a road map data disk D2, a display unit 22 for displaying the animation and the navigational guidance, a touch switch unit 23 including a plurality of touch switches, a phonetically indicating generator 25 for phonetically indicating the navigational guidance to the driver, a beacon 49 receiver 27 for receiving beacon information from beacon antennas, and a global positioning system (hereinlater simply referred to as "GPS") receiver 29 for receiving electric waves from a plurality of GPS satellites revolving around the earth.

The map indication data disk D1 stores road map indication data indicative of road maps to be indicated in the display unit 22. The road map indication data are derived on the basis of a map data base providing maps drawn to a scale of 1/2,500 and include data indicative of roads, data indicative of place-names, data indicative of famous facilities, data indicative of railways, and data indicative of rivers.

The road map data disk D2 stores road map data indicative of a road map (including highways and streets) divided into a plurality of mesh sections, and including node data indicative of nodes defined by coordinates and formed by intersections, corners and ends of roads, link data indicative of links each connecting two of the nodes to define a road segment, and road width data indicative of the widths of the road segments. The node data are further indicative of nodes formed by the ends of the roads in a border between two of the mesh sections. The road map data further include data indicative of link numbers for designating the links, data indicative of the start address and the end address of each of links, data indicative of the travel needed time from the start address to the end address, data indicative of the lengths of the links, data indicative of classification of the road, data for specifying the one-way traffic roads, data indicative of "no turning to the right and the left", and data for specifying toll highways. In view of the characteristics of the map data base, the highways of the road map form a closed road network in the whole country.

The locator 15 is designed to calculate the current position of the vehicle. Specifically, the variation amount of the travel direction is calculated by the locator 15 on the basis of the travel direction detected by the geomagnetic sensor 12 and the turn angle detected by the oscillation gyro sensor 16. At the same time, the movement distance of the vehicle is calculated by the locator 15 on the basis of the travel distance detected by the distance sensor 15 and the forward and backward movement detected by the shift sensor 13. If initial position data indicative of the initial position of the vehicle is inputted to the locator 15 before the start of the vehicle, the locator 15 can calculate the current position of the vehicle remote from the initial position.

Based on the current vehicle position data, the locator 15 also calculates traveled route data indicative of the route which the vehicle has traveled, and compares the route pattern defined by the traveled route data with the road patterns stored in the road map data disk D2 (by a so-called map matching method), thereby making it possible to determine a most probable road which the vehicle is traveling at present and recalculate the current vehicle position indicative of the current position of the vehicle on the determined road.

The current vehicle position data recalculated through the map matching method are fed to the controller 17 functioning as the center of the control of the navigation apparatus. The controller 17 comprises a CPU (Central Processing Unit), a ROM (Read Only Memory) and a RAM (Random Access Memory), and is electrically connected to the locator 15, the memory driver 18, the graphic generator 24, the display unit 22, the touch switch unit 23 and the phonetically indicating generator 25. The controller 17 controls the memory driver 18 on the basis of the current vehicle position data calculated by the locator 15. The road map indication data prepared for indication and covering the current position of the vehicle are read out from the map indication data disk D1 and fed to the controller 17 by the memory driver 18 in response to the control signal outputted from the controller 17. The current vehicle position data calculated by the locator 15 and the road map indication data read out by the memory driver 18 are fed to the display unit 22 from the controller 17, so that the road map and the current vehicle position can be displayed on the screen of the display unit 22 in such a manner that the current position of the vehicle is shown on the road map by a predetermined mark.

The memory driver 18 further reads out from the road map data disk D2 road map data used during the calculation of the optimum travel route between the current vehicle position and the destination, and feeds the road map data to the controller 17 to determine the coordinates defining the optimum travel route on the road map, thereby making it possible to have the display unit 22 display the optimum travel route.

The controller 17 is electrically connected to the beacon receiver 27 designed to receive beacon information transmitted from beacon antennas placed on the road sides. ,The beacon information include position information and road information (indicative of the names of the intersections and the places to which the roads leads) and are fed to the controller 17 so as to be indicated on the screen of the display unit 22, thereby making it possible to inform the driver of the beacon information. The GPS receiver 29 electrically connected to the locator 15 is an optional equipment. If the navigation apparatus comprises the GPS receiver 29, signals transmitted from the GPS satellites are fed to the locator 15 through the GPS receiver 29, so that locator 15 can detect the accurate current travel direction of the vehicle and the accurate current position of the vehicle.

Figure 14:
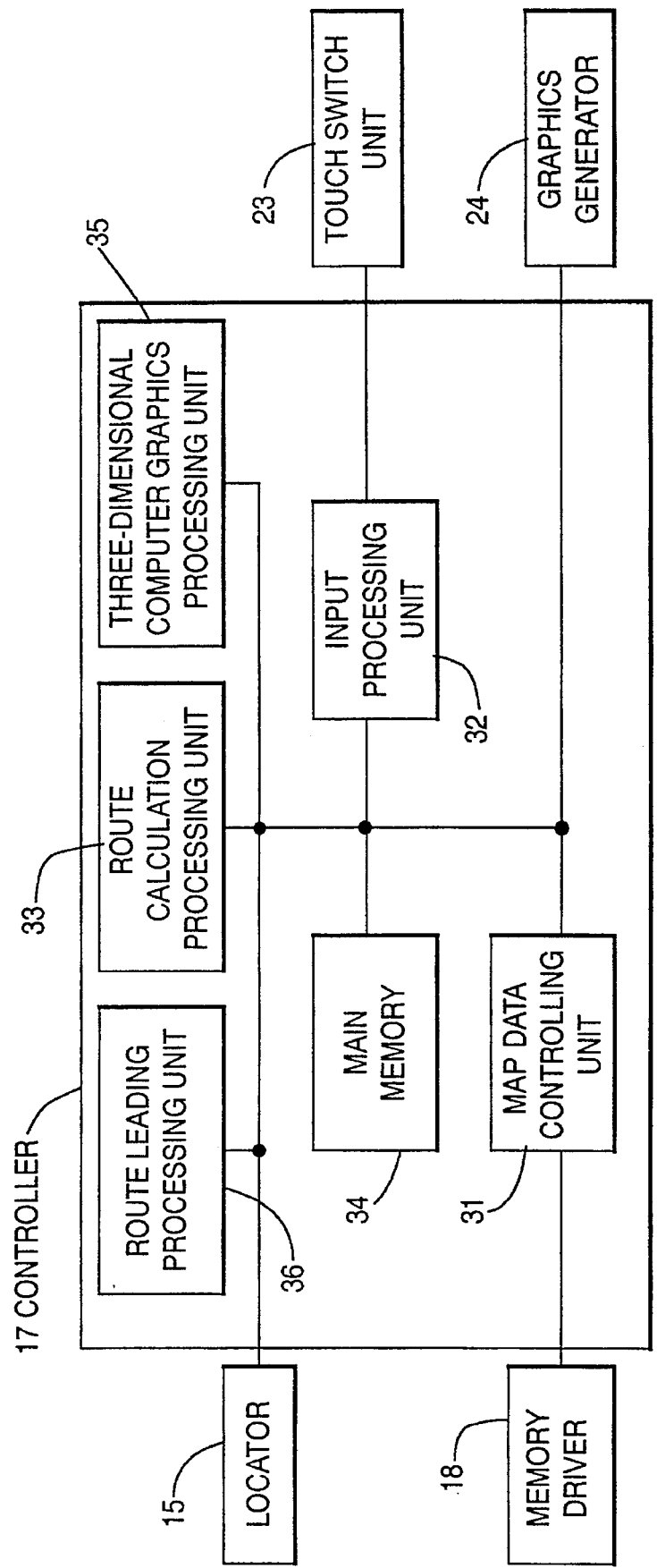
FIG. 14 is a block diagram showing the controller shown in FIG. 13.

FIG. 14 is a block diagram representing the controller 17 which comprises a map data controlling unit 31 for reading out the specified road map indication data and the road map data from the road map indication data disks D1 and the road map data disk D2, respectively, through the memory driver 18, an input processing unit 32 for converting the operations of the touch switches of touch switch unit 23 into signals, an optimum route calculation processing unit 33 for calculating the optimum travel route data on the basis of the destination data, the current vehicle position data derived from locator 15, and the link and node data, a main memory 34 for storing various data, a three-dimensional computer graphics processing unit 35 for three-dimensionally processing various image data, and a route leading processing unit 36 for controlling the indication of the display unit 22.

After the optimum travel route are calculated by the optimum route calculation processing unit 33, the road data and the background data covering the optimum travel route are calculated by the three-dimensional computer graphics processing unit 35 forming the center of the animation processing in order to derive the series of road drawings to be three-dimensionally watched from the driver's seat.

The road data in this embodiment are similar to those calculated by the calculator 4 of the aforementioned embodiment shown in FIG. 1 and can be calculated according to processes similar to those of the aforementioned embodiment explained with reference to FIGS. 2 to 6. The processes are simply described hereinafter. The map data controlling unit 31 is accessed by the input processing unit 32 for reading out the road map indication data from the map indication data disk D1. Then, the widths of the roads forming the optimum travel route and the widths of the other roads shown in the road drawings are determined. The smoothing processes are carried out in order to smooth the corners of the intersections on the optimum travel route. The center lines, sidewalks and pedestrian crossings are added to the road drawings.

The background data are calculated according to processes similar to those of the aforementioned embodiment explained with reference to FIGS. 7 to 10. In the explanation with reference to FIGS. 7 and 8, the background data including the architecture data and road sign data are automatically derived on the basis of the random numbers. In the present embodiment, however, the background data may be derived on the basis of the road map data stored in the road map data disk D2. In this case, the road map data includes background element data including architecture data indicative of architectures, traffic light data indicative of traffic lights, road sign data indicative of road signs, guardrail data indicative of guardrails, tree and shrub data indicative of trees and shrubs, and geographical feature data indicative of geographical features. The architectures data include, for example, data indicative of positions, shapes and colors of facilities such as famous buildings. The geographical features represents, for example, mountains, parks and bridges. Additionally, the background data may be derived on the basis of both the calculation data based on the random numbers and the store data based on road map data stored in the road map data disk D2.

The road drawing data are indicative of the series of the road drawings to be watched from the driver's seat during the travel, and are calculated on the basis of the road data, the background data and the actual travel speed of the vehicle calculated by the locator 15 by the three-dimensional computer graphics. Then, the road drawing data are fed to the graphic generator 24 in order to convert the road drawing data into data suitable for indication in the display unit 22, thereby making it possible to have the display unit 22 display the animation synchronous with the actual travel of the vehicle.

As will be understood from the foregoing descriptions, the animation formed by the series of road drawings to be watched from the driver's seat during the travel between the current vehicle position and the destination are displayed on the screen of the display unit 22 at real time during the actual travel between the current vehicle position and the destination. Therefore, the animation displayed by the display unit 22 is useful not only for leading the driver to the destination but also for pleasing the eyes of the passengers.

In the navigation apparatus, the optimum travel route and the current position of the vehicle are derived by the travel route calculation processing unit 33 and the locator 15, respectively. The optimum travel route and the current vehicle position may be indicated with the animation as shown in FIG. 12, thereby making it possible to easily lead the driver to the destination.

In FIG. 12, the animation is displayed on the screen of the display unit 22, and the navigational guidance is indicated in the windows opened on the screen. On the contrary, the animation may be displayed in the windows opened on the screen of the display unit 22, and the navigational guidance may be displayed on the screen.

The animation may be displayed on the screen of the display unit 22 while the vehicle travels from a first position approaching toward each of the intersections on the optimum travel route to a second position departing from the intersection under condition that the navigational guidance is indicated on the screen or in the window at all times, thereby making it possible to have the driver identify the marked architecture such as a gas station in the neighborhood of each of the intersections.

The advance direction of the vehicle may be phonetically indicated by the phonetically indicating generator 25 before the vehicle reaches through each of the intersections, thereby making it possible to certainly lead the driver to the destination.

The optimum travel route is calculated when the driver inputs the destination to the navigation apparatus through the touch switch unit 23, so that the animation can be produced and displayed before the start of the vehicle. If the animation is displayed at rapid advance speed before the start of the vehicle, the driver can simulate the travel on the optimum travel in a short time. In the case which the background data calculated on the basis of the background element data stored in the road map disk D2, the driver can previously commit the background watched during the actual travel to memory.

It will be understood by those skilled in the art that the foregoing description is in terms of preferred embodiment of the present invention wherein various changes and modification may be made without departing from the spirit and scope of the invention, as set forth in the appended claims.

What is claimed is:

1. A method of producing an animation having a series of three dimensional road drawings to be watched from a driver's seat of a vehicle during a travel between two predetermined positions in a road map, said three dimensional road drawings being formed on the basis of road data obtained through three dimensional computer graphics, and said road data being indicative of roads shown in said animation, comprising the steps of:

providing travel route data indicative of a travel route between said predetermined positions, and storing road map data including node data indicative of nodes formed by intersections, corners and ends of roads, link data indicative of links each connecting two of said nodes to define a road segment, and road width data indicative of widths of said road segment;

selecting the road map data covering said travel route based on the provided travel route data;

calculating the road data forming the series of three dimensional road drawings on the basis of the node and link data of the selected road map data to produce said animation having the series of three dimensional drawings; and displaying said animation on a screen of a display.

2. A method as set forth in claim 1, wherein said travel route data include travel speed data indicative of the travel speed of said vehicle in said animation, said method further comprising the step of determining the advance speed of said animation on the basis of said travel speed data.

3. A method of producing an animation having a series of three dimensional road drawings to be watched from a drivers seat of a vehicle during a travel between two predetermine positions in a road map, said three dimensional road drawings being formed on the basis of road data and background data obtained through three dimensional computer graphics, and said road data and said background data being indicative of roads and backgrounds, respectively, shown in said animation, comprising the steps of:

providing travel route data indicative of travel route between said predetermined positions, and storing road map data including node data indicative of nodes formed by intersections, corners and ends of roads, link data indicative of links each connecting two of said nodes to define a road segment and road width data indicative of widths of said road segments, generating random numbers;

selecting the road map data covering said travel route based on said travel route data;

calculating the road data forming the series of three dimensional road drawings on the basis of the node and link data of the selected road map data to produce said animation having the series of three dimensional drawings;

calculating said background data on the basis of the generated random numbers to produce said animation in such a manner that said backgrounds are three-dimensionally shown in said three dimensional road drawings; and displaying said animation on a screen of a display.

4. A method as set forth in claim 3, wherein said travel route data include travel speed data indicative of the travel speed of said vehicle in said animation, said method further comprising the step of determining the advance speed of said animation on the basis of said travel speed data.

5. A method as set forth in claim 3, wherein said background drawing data include architecture data indicative of architectures, traffic light data indicative of traffic lights, road sign data indicative of road signs, guardrail data indicative of guardrails and, tree and shrub data indicative of trees and shrubs.

6. An apparatus for producing an animation having a series of three-dimensional road drawings to be watched from a driver's seat of a vehicle during a travel from the current position of said vehicle to a destination, said three-dimensional road drawings being formed on the basis of road data and background data obtained through three-dimensional computer graphics, and said road data and said background data being indicative of roads and background, respectively, shown in said animation, comprising:

vehicle position detecting means for detecting the current position of said vehicle;

optimum travel route data calculating means for calculating optimum travel route data indicative of an optimum travel route between the current position of said vehicle and said destination;

road map data storing means for storing road map data to be referred to during said travel on said optimum travel route;

road map data selecting means for selecting from said road map data storing means the road map data covering said optimum travel route;

road data calculating means for calculating the road data forming the series of three-dimensional road drawings on the basis of the node and link data of the selected road map data to produce said animation having the series of three-dimensional road drawings;

background data calculating means for calculating said background data to produce said animation in such a manner that said backgrounds are three-dimensionally shown in said three-dimensional road drawings; and animation displaying means for displaying the produced animation.

7. An apparatus as set forth in claim 6, further comprising random number generating means for generating random numbers, said background data being calculated by said background data calculating means on the basis of said generated random numbers and including architecture data indicative of architectures, traffic light data indicative of traffic lights, road sign data indicative of road signs, guardrail data indicative of guardrails, and tree and shrub data indicative of trees and shrubs, wherein said road map data stored in said road map storing means include node data indicative of nodes formed by intersections, corners and ends of roads, link data indicative of links each connecting two of said nodes to define a road segment, and road width data indicative of the widths of said road segments.

8. An apparatus as set forth in claim 6, further comprising:

background element data storing means for storing background element data including architecture data indicative of architectures, traffic light data indicative of traffic lights, road sign data indicative of road signs, guardrail data indicative of guardrails, tree and shrub data indicative of trees and shrubs, and geographical feature data indicative of geographical features, said background element data covering the whole area defined by said road map data stored in said road map data storing means; and background element data selecting means for selecting from background element data storing means background element data covering said optimum travel route, said background data being calculated by said background data calculating means on the basis of said selected background element data, wherein said road map data stored in said road data storing means include node data indicative of nodes formed by intersections, corners and ends of roads, link data indicative of links each connecting two of said nodes to define a road segment, and road width data indicative of the widths of said road segments.

9. An apparatus as set forth in claim 6, wherein said animation displaying means opens a window on its own screen showing said animation and displays said optimum travel route, the current position of said vehicle, and said road map covering the current position of said vehicle in said window in such a manner that said optimum travel route and the current position of said vehicle are overlaid upon said road map.

10. An apparatus as set forth in claim 6, wherein said animation displaying means opens a window showing said animation on its own screen and displays said optimum travel route, the current position of said vehicle, and said road map covering the current position of said vehicle on said screen in such a manner that said optimum travel route and the current position of said vehicle are overlaid upon said road map.

11. An apparatus as set forth in claim 6, wherein based on the current position of said vehicle detected by said vehicle position detecting means, said animation displaying means displays said animation while said vehicle travels from a first position approaching toward each of the intersections on said optimum travel route to a second position departing from the intersection, and subsequently displays said optimum travel route, the current position of said vehicle, and the road map covering the current position of said vehicle while said vehicle travels from said second position to a third position approaching toward the next intersection in such a manner that said optimum travel route and the current position of said vehicle are overlaid upon a road map.

12. An apparatus as set forth in claim 6, further comprising advance direction indicating means for phonetically indicating an advance direction of said vehicle at each of the intersections on the basis of said travel route data before said vehicle reaches the intersection.

* * * * *